March 27, 1956
E. D. GARRETT
2,739,581
ENGINE SPEED GOVERNOR
Filed Feb. 1, 1954
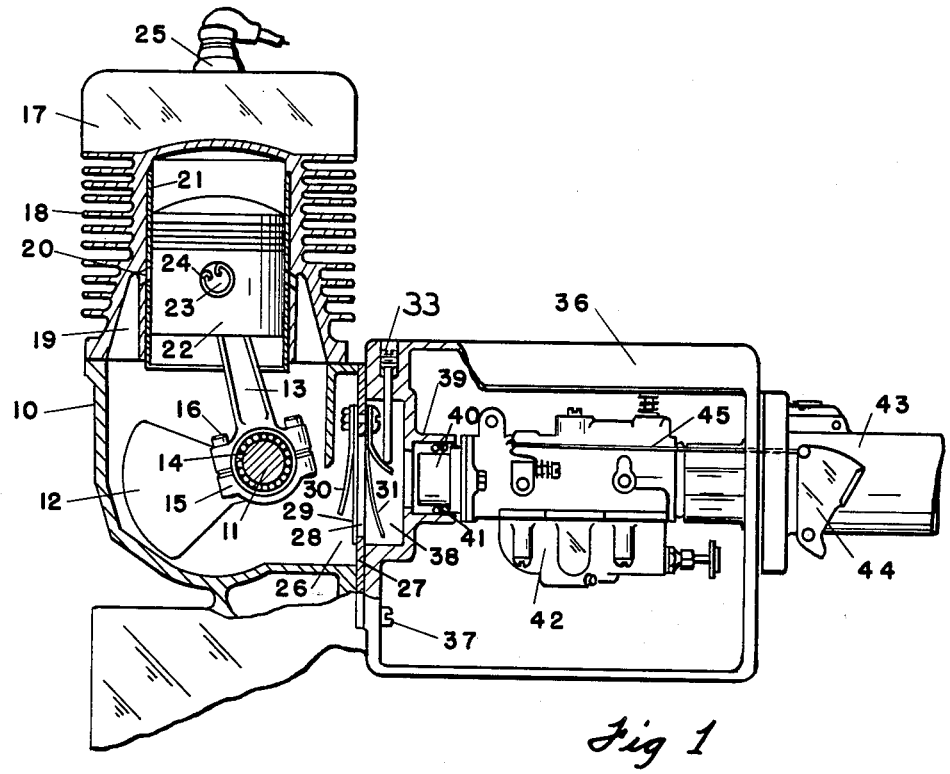
*Fig 1*
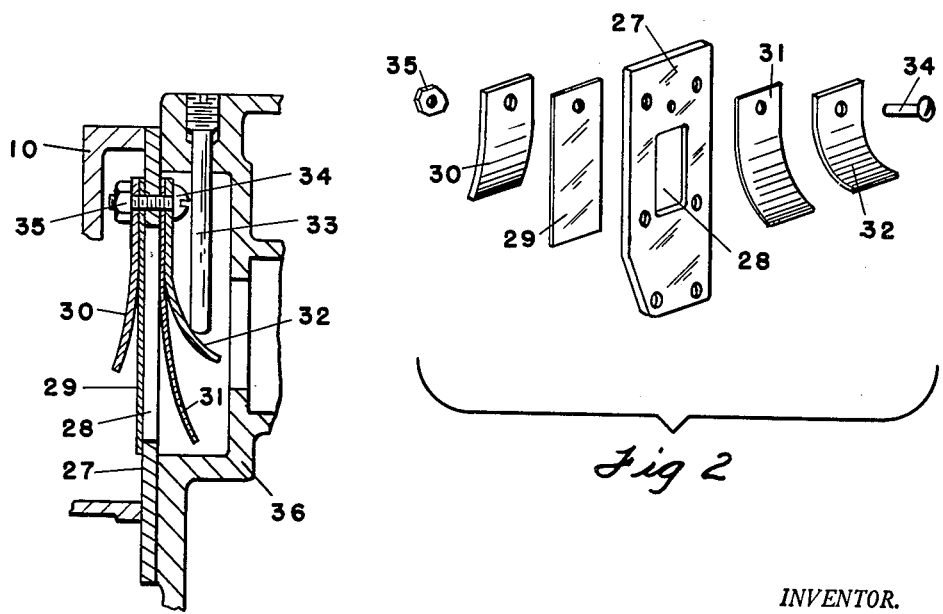
*Fig 2*
*Fig 3*
INVENTOR.
Ernest D. Garrett
BY
ATTORNEY United States Patent Office 2,739,581
Patented Mar. 27, 1956

2,739,581

ENGINE SPEED GOVERNOR

Ernest D. Garrett, Shreveport, La., assignor to Poulan Manufacturing Corporation, Shreveport, La., a corporation of Louisiana Application February 1, 1954, Serial No. 407,389

6 Claims. (Cl. 123—103)

The present invention pertains to speed governors generally but more in particular to a speed governor for gas or gasoline engines. Through the following specification, reference will be made to a single cylinder, two-cycle gasoline engine as illustrated in the accompanying drawing, but it is to be understood that the invention as illustrated and claimed may be used or adapted for use on any type or style of engine using a carburetor or fuel injector.

In the manufacture of small engines, particularly of the portable type, it is always desirable to keep weight to a minimum while providing for maximum horsepower and the other features required by the job to be performed by the engine. If the engine is of the stationary type, weight is not usually of prime importance, and the added weight of assemblies and mechanisms for governing the speed of the engine is not prohibitive. If the engine is of the portable type, however, such as in a chain saw or the like, every effort is made to keep weight to a bare minimum. Even the addition of a few small levers or other working parts adds to the load that the operator must finally carry. As disclosed by the prior art, former speed governors have consisted in elaborate and complicated mechanisms involving pressurized chambers, electric circuits, diaphragms, chokes and the like, all requiring considerable space and adding weight to the complete engine.

It is known that in a two-cycle engine, the maximum horsepower and torque are usually obtained at a relatively high speed, but to go beyond this speed simply causes excessive vibration and wear which shortens the life of the engine.

It is one of the objects of the present invention, therefore, to provide a speed governor which is light in weight and which consists of a minimum number of parts, all of which being substantially fixed.

It is another object of the invention to provide a speed governor using a vibrating reed to cut off the gas flow to the engine, the reed being "tuned" to resonate at a frequency corresponding to vibrations of the engine and hence to the number of revolutions of the crankshaft. The invention employs the vibrating reed principle commonly used in the electronic industry in resonating circuits or tubes, but it is not believed that this principle has ever been employed for use as a mechanical speed governor.

Other objects and advantages of the invention will become apparent in the course of the following detailed description when viewed together with the accompanying drawing in which:

Fig. 1 is a side view of a portion of a two-cycle engine employing the present invention in a speed governor, parts of the engine being broken away.

Fig. 2 is an exploded view of the parts of the present invention in a speed governor.

Fig. 3 is an enlarged detailed sectional view of the invention more clearly illustrating its operating principles.

In the drawings, numeral 10 designates a portion of an engine crankcase which has been broken away to show the operation of the present invention. Numeral 11 designates the "throw" portion of the crankshaft with the counterweight being shown at 12. The lower end of the connecting rod 13 is bored and journaled over the crank throw with suitable roller bearings 14, the rod cap 15 being held in position by means of cap screws 16. The cylinder 17 is of the air cooled type and is cast with air cooling fins 18. Intake gas passageways 19 are molded into the side walls of the cylinder with suitable intake ports 20. The cylinder also includes a liner 21 cast integrally with the cylinder and bored with sufficient clearance for the piston 22. The upper end of the rod 13 is pivotally mounted to a wrist pin 23 held against lateral movement in the conventional manner by means of a keeper ring 24. While not shown in the drawing, the exhaust ports are also cast into the cylinder walls at right angles or 90 degrees away from the intake ports 20 and positioned slightly above the same so as to permit the burnt gases to escape before opening the intake ports for a charge of fresh gas, as is well known in the art. The spark plug 25, the top of which can be seen in Fig. 1, is above the exhaust ports and enters the cylinder at an angle.

At the side of the crankcase 10 is an opening 26 over which I have placed the orifice plate 27 of my invention. Covering the orifice 28 on the crankcase side of the orifice plate 27 is a reed valve 29 with its bent back-up plate 30. On the opposite, or carburetor, side of the orifice plate 27 and disposed over the orifice 28 is the reed governor 31, together with its back-up plate 32. It will be noted here that the reed governor is slightly bent which makes it tend to stand away from the orifice 28. As shown in the drawing, the governor back-up plate 32 is provided with an even sharper bend which is contacted from the back side by the point of an adjusting screw 33. Both reeds with their backing plates are held firmly together against the orifice plate by means of a screw 34 and a nut 35. The backing plates, particularly that of the reed governor 31, is made of a spring material so that by turning the head of the adjusting screw 33 clockwise or counterclockwise the effective length of the "tuned" governor reed 31 may be lengthened or shortened to affect its resonant frequency.

Fig. 1 shows the governor orifice plate 27 interposed between the opening 26 in the side of the crankcase 10 and a carburetor frame or carrier 36 with screws 37 being extended through the front wall of the carrier 36, then through the orifice plate 27 and into the crankcase 10. The carrier 36 is provided with a recess 38 molded into its front face as a working area for the governor reed 31. The rearwardly extending boss 39 serves as a journal box for receiving the forward end of a carburetor adaptor 40. Packing 41 is placed in the journal box 39 to prevent leaks of fuel and air. The rear end of the carburetor 42 is fastened to the forward end of a handle 43 whose forward end protrudes through the rear wall portion of the carburetor carrier 36. Pivotally affixed to the side of the handle 43 is a throttle control lever 44 with the necessary throttle wire 45 extending to the throttle shaft of the carburetor 42.

Let it be assumed, now, that the engine as described above is to be provided with a speed governor made according to the teachings of the present invention. It is known that a reed such as mentioned in this application possesses a known characteristic called a resonant frequency and if the physical dimensions of the reed are known, such resonant frequency can be calculated mathematically. Let it be further assumed that it is desired to govern the speed of the engine at 5,000 revolutions per minute. Since every revolution of the crankshaft of the engine will produce a single, primary vibration, then 5,000 revolutions per minute will correspond to the resonant frequency of the governing reed. The governing reed 31 is made accordingly and is placed on the rear side of the orifice plate as already described. When the engine is running, and the piston is making its upward stroke, fuel is drawn into the crankcase from the carburetor 41, the fuel passing by the bent governor reed 31, through the orifice 28 and by the reed valve 29 which has been drawn away from the orifice 28 by the partial vacuum in the crankcase. When the piston 22 is making its downward stroke, it closes the intake ports 20 temporarily, thus putting sufficient pressure on the gas in the crankcase to close the reed valve 29 tightly against the orifice 28. Thus, at every revolution of the crankshaft, the reed valve opens and closes, admitting a charge of gas into the crankcase sufficient for the operation of the engine; and the operator, by advancing and retarding the throttle lever 44, may use the engine at various speeds below the governed speed of 5,000 R. P. M. Now, let it be supposed that the throttle is advanced to its limit and the engine is permitted to run at its maximum speed. When the revolutions per minute reach the predetermined 5,000, the governing reed 31, instead of staying in the bent position and away from the orifice plate 27, will begin to resonate, its entire mass becoming supple and limber. This same phenomenon is true of an electronic tube whose resistance is zero when oscillating at its point of resonance. When this condition is reached, the velocity and slight pressure from the fuel flow striking against its back side, is sufficient to push the reed against the back side of the orifice plate, close the orifice and stop the fuel flow. As the reed touches the orifice plate, its frequency immediately changes since its period of vibration is interrupted by striking an outside object, and the reed tends to assume its normal position away from the plate. As the engine again reaches 5,000 R. P. M., the action is repeated, the reed 31 being pushed against the plate 27 to stop the fuel flow and then backing away to admit more fuel. The action, however, is performed with such rapidity that the engine runs smoothly and steadily at the governed speed. When the throttle is finally retarded, the reed 31 again assumes its normal position away from the orifice plate 27 since it is not affected by any frequency other than its resonant frequency.

If it is desired to vary the resonant frequency of the reed 31, or if the material of which the reed is made possesses some flaw which might affect its resonant frequency, adjustment can be made by means of the screw 33 as formerly described. Since the backing plate 32 of the reed governor is made of a spring material, it will simply be pushed by the point of the screw 33 in the plane of the governor plate 27, thus in effect shortening the effective length of the reed 31 and raising its resonant frequency. When this is done, the reed will respond to the greater number of vibrations per minute and hence to a greater number of revolutions per minute of the crankshaft. When the screw 33 is raised, the backing plate 32 will spring away from the reed 31, thus giving it greater length and lowering its resonant frequency.

While I have described a method of varying the resonant frequency by means of an adjusting screw, it will be understood that many other ways could be devised such as with cams or even moving reed up and down between two fixed points or clamps. It might even be desired to eliminate all adjustments of the reed since the resonant frequency can be calculated with considerable accuracy.

As for using the present invention with a fuel or throttle valve, it can be readily seen and understood that the invention might easily be combined with a rotary valve system and with other systems where it is desired to have a positive, light-weight, and effective speed governor. Other modifications and changes might also be made in the actual construction without departing from the spirit and scope of my invention as defined by the following claims.

I claim:

1. Apparatus for throttling and governing the speed of a gas engine having a carburetor and an intake opening in the crankcase, an orifice plate adapted to be positioned between the carburetor of the engine and the intake opening in the crankcase, an orifice in said orifice plate, and a flexible reed over said orifice on each side of said plate, one of said reeds being responsive to differentials of pressure within the crankcase to open and close said orifice as a throttle, the other of said reeds being responsive to vibrations to close said orifice upon reaching a number of vibrations corresponding to its own resonant frequency.

2. Apparatus for governing the speed of a gasoline engine comprising a flexible reed interposed in the path of the fuel flow between the carburetor for said engine and the opening in the crankcase thereof, the normal resonant frequency of said reed corresponding to the desired number of revolutions per minute of the crankshaft of said engine, said reed being mounted substantially perpendicularly to the fuel flow along said path and positioned over the crankcase opening so that upon reaching its resonant frequency said reed will be pushed against the opening of the crankcase to close the same by the pressure of the fuel flow from the carburetor.

3. In a speed governor for gas engines, a flexible reed interposed in the path of the fuel flow between the discharge opening of the carburetor for said engine and the crankcase opening thereof, said reed being mounted substantially perpendicularly to the said path, one end of said reed being bent to permit fuel flow past the same from said carburetor and into said crankcase, said reed having a resonating frequency corresponding to the desired number of revolutions per minute of said engine, said reed being responsive to fuel flow pressure acting upon the same from said carburetor to close said crankcase opening when said reed begins to vibrate at its resonant frequency.

4. A speed governor for gas engines comprising a plate adapted to be positioned between the carburetor for said engine and an opening in the crankcase thereof, said plate being provided with an orifice therethrough, a reed-type valve positioned on said plate on the downstream side from said carburetor to normally close said orifice, said reed being responsive to differentials of pressure within said crankcase for opening and closing said orifice, a second reed mounted on said plate between said first reed and said carburetor, said second reed being bent outwardly away from said orifice in said place and being tuned to a frequency corresponding to vibrations of said engine at a desired number of revolutions per minute, said second reed being further responsive to the surge of gas flow thereby to close said orifice upon reaching its tuned frequency.

5. Throttle and speed governing mechanism for gas engines comprising an orifice plate adapted to be positioned between the carburetor for said engine and the intake opening in the crankcase thereof, an orifice in said orifice plate, a reed valve mounted to said plate normally covering said orifice on the downstream side of said carburetor and responsive to differentials in pressure from said crankcase for opening and closing said orifice, a second reed mounted on the opposite side of said orifice plate and disposed over said orifice, said second reed being normally bent away from said orifice to permit an ungoverned flow of fuel past said reed valve, said second reed having such resonant frequency as to respond to a desired number of revolutions per minute of the crankshaft of said engine, said second reed being also responsive to fuel flow from said carburetor to close said orifice when said reed reaches its resonating state, and means for varying the resonating frequency of said second reed.

6. Throttle and speed governing mechanism for gas engines comprising an orifice plate adapted to be positioned between the carburetor for said engine and the gas intake opening in the crankcase thereof, an orifice in said orifice plate, a flexible reed-type valve having one end affixed to said orifice plate and the other end normally closing the orifice in said orifice plate, said reed-type valve being bendable and responsive to differentials in pressure within said crankcase to open and close said orifice, a stop member for limiting the opening of said orifice by limiting the bend of said reed-type valve, a second flexible reed-type valve also having one end affixed to the orifice plate and positioned on the opposite side of said plate from said first mentioned reed-type valve, the opposite end of said second reed-type valve being bent away from said orifice to permit control of fuel flow past said first mentioned reed-type valve, said second reed-type valve being responsive to engine vibrations corresponding to its own resonant frequency and responsive also while vibrating at such resonant frequency to fuel pressure from said carburetor to close said orifice, a yieldable stop member for said second reed-type valve, said stop member being juxtapositioned with said second reed-type valve for a portion of its length against said orifice plate, and means for moving said stop member against and away from said second reed-type valve to effect higher and lower resonating frequencies thereof.

References Cited in the file of this patent
UNITED STATES PATENTS

| | | |
|---|---|---|
| 1,346,521 | Young | July 13, 1920 |
| 1,624,093 | Davis | Apr. 12, 1927 |
| 1,757,353 | Barnard | May 6, 1930 |
| 2,442,217 | Smith | May 25, 1948 |
| 2,549,478 | Kiekhaefer | Apr. 17, 1951 |
| 2,639,699 | Kiekhaefer | May 26, 1953 |
| 2,669,979 | Kiekhaefer | Feb. 23, 1954 |